United States Patent [19]

Henslee et al.

[11] 4,382,997
[45] May 10, 1983

[54] SPINEL SURFACED OBJECTS

[75] Inventors: Walter W. Henslee, Lake Jackson; Stanley J. Morrow, Clute; John S. Lindsey, Houston; Christopher P. Christenson; Hans H. Schwantje, both of Lake Jackson, all of Tex.

[73] Assignee: The Dow Chemical Company, Midland, Mich.

[21] Appl. No.: 183,909

[22] Filed: Sep. 4, 1980

[51] Int. Cl.$^3$ .................. B32B 9/04; B32B 13/04
[52] U.S. Cl. ......................... 428/446; 427/255; 427/255.4; 427/352; 427/399; 427/431; 428/697; 428/701; 428/702
[58] Field of Search .............. 427/399, 376.2, 431, 427/432, 352, 343, 331, 336, 255, 255.4, 250; 428/446, 701, 469, 697, 471, 472, 450, 702; 148/6.27

[56] References Cited

U.S. PATENT DOCUMENTS

| | | | |
|---|---|---|---|
| 2,912,346 | 11/1959 | Kanter | 427/431 |
| 3,155,534 | 11/1964 | Bruch | 427/255 |
| 3,155,536 | 11/1964 | Freeman et al. | 427/336 |
| 3,253,331 | 5/1966 | Limansky | 427/250 |
| 3,450,574 | 6/1969 | Read | 427/255 |
| 3,479,217 | 11/1969 | Spanoudis | 427/431 |
| 3,740,261 | 6/1973 | Bolin | 427/399 |
| 4,159,357 | 6/1979 | Grunke | 427/255 |

*Primary Examiner*—Sadie L. Childs
*Attorney, Agent, or Firm*—G. R. Baker

[57] ABSTRACT

A method for preparing spinel ($MgAl_2O_4$) surfaces on alumina or alumino silicate articles or shapes by exposure of the article or shape to molten or vaporous magnesium or magnesium alloy for from two to ten hours under nonpyrophoric conditions.

4 Claims, No Drawings

SPINEL SURFACED OBJECTS

BRIEF DESCRIPTION OF THE INVENTION

It has now been found that a dimensionally stable oxidative stable surface comprised of magnesium aluminum oxide ($MgAl_2O_4$) can be prepared by contacting an alumina ($Al_2O_3$), sodium aluminate ($NaAl_{11}O_{17}$) or alumina silicates with molten magnesium metal or a magnesium alloy (e.g. MgAl) for a period of time to permit the magnesium and aluminum to form a crystal structure approximating $MgAl_2O_4$, with a corresponding production of aluminum metal in the case of $Al_2O_3$ or $NaAl_{11}O_{17}$, and aluminum and silicon as well as magnesium silicate when an alumino silicate is employed and the free metals may form alloys with residual magnesium thus providing in situ at, on and into the surface the environment for producing the crystallene structure $MgAl_2O_4$ on, at and in the surface. Upon removal of the shape from contact with the magnesium and washing it with a magnesium dissolving reagent all or part of the surface is $MgAl_2O_4$.

In addition it has been found that treating a $Al_2O_3$ or $NaAl_{11}O_{17}$ surface with magnesium metal vapors, under conditions which prevent oxidative combustion of the vapors, will likewise result in the production of $MgAl_2O_4$ at and in the surface of the object being treated.

The magnesium should be molten or gaseous and the surface should be in contact with the molten or gaseous mass for from about one and one-half to two hours up to 10 or more hours depending on the degree of penetration of the spinel desired. In gaseous treatments it is desirable also to preheat the article since the nearer the body is to the treating temperature when immersed in vaporous magnesium the quicker the reaction will begin.

DETAILED DESCRIPTION OF THE INVENTION

Example 1

Magnesium metal powder, 0.07 gram, was mixed with 0.42 gram of powdered alumino silicate refractory (STR-113 made by The Combustion Engineering Company) and heated under argon to 200° C. for about one hour, at 600° C. for one-half hour, then 700° C. for two hours. The resulting product was cooled over night under an argon atmosphere. X-ray diffraction showed the product to contain a $MgAl_2O_4$ spinel structure, aluminum metal in addition to the refractory oxide (alumino silicate).

Example 2

In another experiment 0.1 gram of magnesium granules and 0.1 gram of the alumino silicate (STR-113) ground to pass a 400 mesh were mixed and heated under argon for 15 hours at 700° C. After cooling, X-ray diffraction analysis showed a distinct spinel ($MgAl_2O_4$) phase was identified.

Example 3

Similarly, other experiments were run employing various alumina sources with equal results. The table below lists the types of alumina employed. The heating schedule, cooling schedule and proportions were the same as those employed in Example 2.

(a) gamma ($\gamma$) alumina (high surface, ~300 m$^2$/g, catalyst support).

(b) high purity tabular aluminua (A-12) manufactured by Alcoa.

(c) amorphous alumina fiber (Saffil high purity alumina fiber).

Example 4

Each of the experiments of Example 3 and Example 2 were repeated using MgO in place of magnesium metal. No spinel was detected by X-ray diffraction.

Example 5

An alpha alumina catalyst support (Norton) 50 cc (~85 g) was placed in a steel screen basket, similarly 15 cc (~25 g) of gamma alumina high surface area catalyst support (~300 M$^2$/g), and 50 cc (~85 g) of Norton alpha alumina catalyst support were each placed in a steel screen basket and the baskets placed in a molten magnesium holding pot which was at about 650° C. The various supports were submerged for from two to nine hours. The Norton aluminas showed the presence of spinel by X-ray diffraction. The gamma alumina support had a black coating on its surface which sluffed-off during removal of the sample from the basket.

Example 6

Five pounds of a Norton alpha alumina support was immersed in molten magnesium (ca 685° C.) for two hours. Upon cooling X-ray diffraction analysis showed spinel formation. The porosity of the support, measured by mercury intrusion after leaching to remove the remaining magnesium metal, had not been altered significantly.

Example 7

Approximately 50 cc of Norton alpha alumina pellets were supported approximately 1½ inches over an iron pot containing magnesium metal pellets. The basket containing the catalyst support had a perforated bottom to allow magnesium vapors to enter. The pot and basket were placed in an iron reaction vessel and purged with argon. The reaction vessel and reactants were heated to 1000° C. under purge and held for 2 hours. They were allowed to cool under purge. The resultant product showed pellets of varying degree of darkening as a function of proximity to the magnesium source. Spinel was present in the reacted support (XRD), showing that a vapor phase reaction had occurred in which $Al_2O_3$ was converted to $MgAl_2O_4$.

In a similar manner alumina refractory brick can be prepared having a spinel surface by immersing the brick into molten magnesium for from two to about nine hours. The depth of the spinel into the surface is directly related to the time the surface is in contact with the magnesium metal.

The techniques above described may also be employed to convert alumina catalyst supports or other porous surfaced alumina containing materials at their surfaces to the spinel structure producing an integral spinel structure surface suitable for catalytic reactions which have some of the physical properties of the original alumina or alumino silicate and little or no change in porosity.

We claim:

1. A method for preparing a spinel faced alumina or alumino silicate surface which comprises:
   contacting at least the surface of an alumina or alumino silicate shape to be modified with molten or gaseous magnesium metal or a magnesium alloy for from about one and one-half to ten hours, at least until the surface in contact with the magnesium attains about 600° C. thereby to convert the surface to a $MgAl_2O_4$ spinel structure;

withdrawing the so contacted shape; and, washing the surface so treated with a magnesium metal dissolving agent.

2. A refractory shape having at least one surface treated in the manner of claim 1.

3. The method of claim 1 wherein the magnesium is molten magnesium or a magnesium alloy.

4. The method of claim 1 wherein the magnesium is vaporized magnesium.

* * * * *